US009011808B2

(12) United States Patent
Schodel et al.

(10) Patent No.: US 9,011,808 B2
(45) Date of Patent: Apr. 21, 2015

(54) METHOD FOR REMOVING IMPURITIES FROM GAS FLOWS COMPRISING OXYGEN

(75) Inventors: Nicole Schodel, Munich (DE); Hans Jorg Zander, Munich (DE); Florian Winkler, Munich (DE); Roland Ritter, Dresden (DE); Torsten Stoffregen, Dresden (DE)

(73) Assignee: Linde AG, Munich (DE)

( * ) Notice: Subject to any disclaimer, the term of this patent is extended or adjusted under 35 U.S.C. 154(b) by 783 days.

(21) Appl. No.: 13/139,390

(22) PCT Filed: Nov. 26, 2009

(86) PCT No.: PCT/EP2009/008445
§ 371 (c)(1),
(2), (4) Date: Aug. 29, 2011

(87) PCT Pub. No.: WO2010/075917
PCT Pub. Date: Jul. 8, 2010

(65) Prior Publication Data
US 2011/0300046 A1   Dec. 8, 2011

(30) Foreign Application Priority Data

Dec. 16, 2008   (DE) .......................... 10 2008 062 496

(51) Int. Cl.
*B01D 53/14* (2006.01)
*C01B 31/20* (2006.01)
*C01G 21/14* (2006.01)
*B01D 53/52* (2006.01)
*B01D 53/60* (2006.01)

(52) U.S. Cl.
CPC ..................................... *B01D 53/60* (2013.01)

(58) Field of Classification Search
None
See application file for complete search history.

(56) References Cited

U.S. PATENT DOCUMENTS

| 4,048,286 A | 9/1977 | Rossmaier |
| 4,219,536 A * | 8/1980 | Hoenke .......................... 423/393 |
| 2007/0122328 A1 | 5/2007 | Allam et al. |

(Continued)

FOREIGN PATENT DOCUMENTS

| DE | 4335867 | 5/1995 |
| DE | 102008062496 | 6/2010 |

(Continued)

OTHER PUBLICATIONS

International Search Report of PCT/EP2009/008445 (Apr. 19, 2010).

(Continued)

*Primary Examiner* — Melvin C Mayes
*Assistant Examiner* — Sheng H Davis
(74) *Attorney, Agent, or Firm* — Millen, White, Zelano & Branigan, P.C.

(57) ABSTRACT

A process for removing impurities, in particular oxides of sulphur ($SO_x$) and/or oxides of nitrogen ($NO_x$) from oxygen-containing gas streams by scrubbing with at least one washing agent is described. In order to achieve effective gas purification in an economical manner even in the case of so-called large "oxyfuel" furnaces which operate with oxygen as fuel gas, it is proposed to convert the impurities at an elevated pressure of at least 2 bar with at least one basic constituent of the washing agent into salts and to wash out said impurities as dissolved salts.

19 Claims, 2 Drawing Sheets

(56) References Cited

U.S. PATENT DOCUMENTS

| | | | |
|---|---|---|---|
| 2007/0178035 A1* | 8/2007 | White et al. | 423/248 |
| 2008/0176174 A1* | 7/2008 | White et al. | 431/5 |
| 2008/0226515 A1* | 9/2008 | Allam et al. | 422/168 |
| 2009/0260585 A1* | 10/2009 | Hack et al. | 122/7 R |
| 2011/0300046 A1 | 12/2011 | Schodel et al. | |
| 2013/0259786 A1 | 10/2013 | Boos et al. | |
| 2014/0086813 A1 | 3/2014 | Schodel et al. | |

FOREIGN PATENT DOCUMENTS

| | | | |
|---|---|---|---|
| EP | 351613 | * | 7/1988 |
| EP | 0351613 | | 1/1990 |
| EP | 1 790 614 A1 | | 5/2007 |
| RU | 2069173 | * | 9/1993 |
| WO | 9422562 | | 10/1994 |

OTHER PUBLICATIONS

English Abstract of Invention of RU Publication No. 2069173. Publication Date: Nov. 20, 1996. RU Application No. 93045491/26. Filing Date: Sep. 7, 1993. (1 page).

International Search Report from PCT/EP2012/001592 dated Jul. 24, 2012.

Australian Examination Report dated Nov. 14, 2014 issued in corresponding 2009335366 application (pp. 1-3).

* cited by examiner

METHOD FOR REMOVING IMPURITIES FROM GAS FLOWS COMPRISING OXYGEN

The invention relates to a process for removing at least a part of at least one impurity which comprises in particular a chemical compound from the group consisting of the oxides of sulphur ($SO_x$) and/or oxides of nitrogen ($NO_x$) from an oxygen-containing gas stream by scrubbing with at least one washing agent.

Power stations, i.e. industrial plants for providing in particular electrical and in some cases additional thermal power, are indispensible for ensuring the energy supply of an economy. Such power stations use primary energy which is made available as useful energy by appropriate conversion. As a rule, gas streams which cannot be released into the environment without further purification steps result. Particularly in caloric power stations in which fossil fuels, e.g. coal, mineral oil or natural gas, are burned, waste gas streams which are designated as flue gases and contain environmentally harmful constituents usually result. What is particularly problematic is the formation of oxides of sulphur and oxides of nitrogen ($SO_x$ and $NO_x$) in the combustion by the fossil fuels. The oxides of sulphur—in particular $SO_2$—are formed predominantly by oxidation from the sulphur present in the fuel. The oxides of nitrogen may form in different ways, for example by oxidation of the nitrogen present in the combustion air and/or in the fuels. Attempts have been made to date to reduce the formation of oxides from nitrogen by primary measures. Thus, for example, specific combustion processes which operate with air gradation or fuel gradation are used. A reduction of the combustion temperature by waste gas recycling also results in reduced formation of oxides of nitrogen. In brown coal power stations, the waste gas limits for $NO_x$ applicable to date are as a rule complied with through primary measures. In coal power stations on the other hand secondary measures are required today in order to reduce the output of oxides of nitrogen. However, secondary measures are required in each case for removing oxides of sulphur. The use of flue gas desulphurization plants (FDP) which operate with alkaline scrubbing has in particular proved useful here. For removal of $NO_x$, only the so-called selective non-catalytic reduction (SNCR) and the so-called selective catalytic reduction (SCR) have become established in practice. If it is intended in particular to achieve low values of oxides of nitrogen in the waste gas, selective catalytic reduction (SCR) has been the method of choice to date. In selective catalytic reduction, in general a vanadium-titanium oxide catalyst having a typical operating temperature of 300 to 450° C. is used. Ammonia or ammonia-forming derivatives, such as, for example, urea, serve as reducing agents.

In addition to the catalytic reduction, catalytic oxidations of oxides of nitrogen or the oxidation of oxides of nitrogen by means of addition of an oxidizing agent and subsequent or simultaneous aqueous scrubbing (e.g. Walther simultaneous process, denox ammonia aerosol process) are also part of the prior art for specific process gases in order to comply with $NO_x$ limits. The Walther process uses, for example, ozone for the oxidation of nitric oxide (NO) to nitrogen dioxide ($NO_2$) and subsequent scrubbing with ammonia for the formation of ammonium nitrite and ammonium nitrate. The low $TO_x$ process developed by BOC (Linde) also operates in a similar manner. Feeding an $NO_2$-rich gas for achieving an equimolar $NO/NO_2$ ratio is also conceivable for better scrubbing in ammonia solutions.

Usually, the scrubbing is carried out after the dust separation in a region virtually at atmospheric pressure. Either simultaneous separation of $SO_x$ and $NO_x$ is effected or serial separation is effected in which first $SO_x$ is washed out, then a complete or partial oxidation of NO to $NO_2$ is carried out and scrubbing is effected in the next step.

An overview of the customary processes for removal of oxides of nitrogen from power station waste gases was given, for example, in the 40th power station colloquium 2008; "Zielkonflikt Emissionen and Energieeffizienz [Conflict of aims between emissions and energy efficiency]"; Prof. M. Beckmann, Prof. U. Gampe, S. Grahl, S. Hellfrisch; T U Dresden, Institute for Energy Technology. The Walther simultaneous process is described, for example, in Chemie Ingenieur Technik 57 (1985) No. 9, pages 717-727. The Walther process is also described in Chemie Ingenieur Technik 57 (1985) No. 3, pages 239-241. The so-called denox ammonia aerosol process is described in Chemie Ingenieur Technik 62 (1990) No. 3, pages 1039-1041. An overview of oxidation processes is finally offered by Ferell, R. J.; A review of oxidation technologies instrumental in simultaneous removal of pollutants from flue gas streams; The proceedings of the 29th International Technical Conference on Coal Utilization & Fuel Systems; 2004, 989-1000.

Future environmental protection laws will prescribe a further reduction of the content of oxides of nitrogen in flue gases of power stations. Thus, a limit of 100 mg/m$^3$ is envisaged, for example, in Germany for power stations which go into operation from 2013. Such low values can be achieved in practice only by secondary measures.

Very recently, new power station concepts have been proposed in which the fossil fuel, for example coal, is burned with an oxygen-rich combustion gas, in particular with technically pure oxygen or with oxygen-enriched air (oxygen combustion gas process). The proportion of oxygen in this combustion gas is, for example, 95 to 99.9% by volume. The resulting flue gas contains mainly carbon dioxide in a proportion of about 70 to 85% by volume. The aim of these new concepts is to force the carbon dioxide forming during the combustion of the fossil fuels and present at high concentration in the flue gas into suitable deposits, in particular into certain rock strata or saltwater-carrying strata, and thus to limit the output of carbon dioxide to the atmosphere. As a result, the climatically harmful effect of greenhouse gases, such as carbon dioxide is to be reduced. Such power stations are designated by those skilled in the art as so-called "oxyfuel" power stations.

Since the flue gases of these power stations, too, contain other environmentally harmful constituents in addition to carbon dioxide, flue gas purification is required, as in conventional power stations, in order to fulfill statutory emission specifications for waste gas emissions into the atmosphere or requirements regarding the storage of carbon dioxide. Particularly during the transport of the carbon dioxide-rich waste gas in pipelines for further use or storage and on introduction into rock formations, certain maximum limits for the sulphur dioxide content and content of oxides of nitrogen have to be observed. In the concepts known to date, deducting, denox and desulphurization of the flue gas are therefore effected in successive steps. After this flue gas purification, the carbon dioxide-rich waste gas thus prepared is compressed in order to be sent for further use or storage. Here too, the removal of the impurities is therefore effected within the region of atmospheric pressure before the compression of the waste gas.

Carbon dioxide-containing gas streams also occur in other large furnaces which are operated with fossil fuels. These include, for example, industrial furnaces, steam boilers and similar large thermal plants for electricity or heat generation. It is conceivable that such plants too are operated with oxygen or oxygen-enriched air, resulting in the formation of carbon dioxide-rich waste gas streams from which the carbon dioxide is separated off and sent for utilization or storage (for example by forcing underground). In this case, maximum limits for the content of oxides of sulphur and of oxides of nitrogen likewise have to be observed.

EP 1 790 614 A1 describes a process for in particular simultaneous removal of sulphur dioxide ($SO_2$) and oxides of nitrogen ($NO_x$) from gaseous carbon dioxide, in which the $SO_2$ is converted into sulphuric acid and the $NO_x$ into nitric acid under elevated pressure in the presence of molecular oxygen ($O_2$) and water. The resulting sulphuric acid and nitric acid are separated off from gaseous carbon dioxide, $SO_2$-free, low $NO_x$ carbon dioxide gas being produced. This process is also intended for the purification of waste gases of a power station operating by the oxygen fuel gas process ("oxyfuel" power station), in which a carbon dioxide-rich flue gas results. A disadvantage of this known process is that acids are produced which present considerable problems in their further processing or disposal. In particular, corrosion of product-carrying apparatuses and pipes may occur, which results in an increased material requirement and/or impairment of operation. Moreover, the acids which are present as a mixture must be treated as a waste product if no complicated working-up with a view to further utilization is possible.

It is an object of the present invention to design a process of the type mentioned at the outset in such a way that effective removal of the impurities from the gas stream is permitted in an economical manner without environmentally harmful by-products forming thereby.

This object is achieved, according to the invention, if the impurity is converted at an elevated pressure of at least 2 bar by reaction with the oxygen present in the gas stream and with at least one basic constituent of the washing agent into at least one salt, which is washed out as dissolved salt.

With this procedure, there is the possibility of removing the impurities, in particular $NO_x$ and $SO_x$, by means of a scrubber which can be integrated, in combination with a direct cooler, into a waste gas train.

Compared with the previously used methods for purifying gas streams, in particular power station waste gases, by means of alkaline scrubbing, there are considerable technical and economic improvements. Owing to the pressure increase, the conversion of the impurities into dissolved salts takes place automatically and in an accelerated manner so that the overall efficiency of the waste gas purification is improved. For example, the pressure increase permits an accelerated oxidation of NO to $NO_2$ by the oxygen present in the gas stream, without additional oxidizing agents having to be added or an upstream catalytic stage for oxidation having to be included upstream. Finally, the washing out as nitrite or nitrate salt is promoted thereby.

In contrast to the prior art according to EP 1 790 614 A1, no acids are produced in the process according to the invention. The corrosion and handling problems associated with the production of acids can therefore be prevented by the invention. This is achieved by using a washing agent which comprises basic constituents. By reaction of the basic constituents with the impurities, such as $NO_2$ and $SO_2$, these are converted into salts and washed out as dissolved salts.

The basic constituents may also be introduced into the gas stream as additives in dissolved or undissolved form prior to the scrubbing, in order further to reduce the risk of corrosion by resulting acids before the actual removal of the impurities. For example, ammonia ($NH_3$) as a solution or in gaseous form can be added for this purpose upstream of the scrubbing so that acids formed are immediately converted into salts.

Preferably, a washing agent which contains at least ammonia ($NH_3$) and/or sodium hydroxide (NaOH) as the basic constituent is used.

The scrubbing is capable of simultaneously removing $SO_2$ and $SO_3$ as well as $NO_x$. The scrubbing can be effected as a fine purification according to conventional desulphurization and denox applications or can replace one or both applications. Expediently, the scrubbing is effected at the end of a purification chain for the gas stream. Accordingly, in particular dedusting and desulphurization of the gas stream in the region virtually at atmospheric pressure is present upstream of the scrubbing under elevated pressure. Consequently, the gas stream fed to the scrubbing is substantially dust- and sulphur-free, with the result that the scrubbing can be tailored to the remaining impurities, in particular oxides of nitrogen. The catalytic denox (e.g. SCR) usually upstream of the desulphurization can then be omitted and can be replaced by the downstream scrubbing according to the invention. The washing agent laden with the salts can be sent for further applications. For example, it may serve as a starting material for fertilizers. Preferably, at least a part of the washing agent laden with the dissolved salt or with the dissolved salts is converted into a form which can be disposed of on a landfill and/or is regenerated. In the case of regeneration, ammonium nitrite can be decomposed into $N_2$ and $H_2O$ thermally and/or catalytically.

Particular advantages result on application of the invention to large furnaces, in particular power stations, which operate by the oxygen fuel gas process (so-called "oxyfuel" plants). In such plants, compression of the carbon dioxide-rich waste gas is already provided in order to be able to send said waste gas for use or storage. This waste gas compression can be utilized in a technically elegant manner for the purpose of the invention. Accordingly, the scrubbing of the waste gas is effected in the region of this waste gas compression at elevated pressure. In this particularly preferred variant of the invention, the compressed waste gas stream is therefore formed from a carbon dioxide-rich waste gas stream of a large furnace, in particular of a power station, fossil fuels being burned with a combustion gas which has a higher proportion of oxygen than air in the large furnace.

In this case, it is expedient to recycle a part of the carbon dioxide-rich gas stream before the compression of the gas stream for combustion. Firstly, this results in a reduction of the formation of oxides of nitrogen during the combustion, owing to lowering of the combustion temperature. Secondly, the gas volume stream fed to the scrubbing is reduced in magnitude, which facilitates the design of the scrubbing. The gas recycling can be effected before or after a flue gas desulphurization unit (FDP), which is preferably upstream of the compression of the gas stream.

After the scrubbing, the compressed, carbon dioxide-rich gas stream substantially freed from impurities can be sent for use and/or storage. For this purpose, it can be transported, for example, via pipelines to a place of use and forced there into underground rock strata or into saltwater-carrying strata without there being any danger of corrosion of the pipelines or an adverse effect on rock formations due to the action of oxides of nitrogen.

The scrubbing is preferably used at a pressure between 10 and 60 bar, particularly preferably between 20 and 40 bar.

In addition, the scrubbing is advantageously effected at a temperature in the range from 10 to 120° C., particularly preferably in the range from 10 to 35° C.

The gas stream preferably has an oxygen content in a range from 2 to 20% by volume, in particular from 3 to 6% by volume.

Oxidation of NO to $NO_2$ in the gas phase can be carried out even before the scrubbing. For this purpose, the required residence time can be provided by design measures. For accelerating the reaction of NO to give $NO_2$, a catalyst may also be used. Moreover, conversion of $NO_2$ into nitrite or nitrate can be carried out by feeding in an additive.

A particularly preferred configuration of the invention envisages that at least one substance which promotes mass transfer by increasing the surface area is added to the washing agent. For example, coal particles may be added for this purpose. Those substances which serve as a catalyst or as a support for a catalyst are preferably used. As a result, in particular the oxidation steps taking place can be catalyzed.

The gas stream is expediently cooled by means of cool water or cold water from a refrigeration plant. A scrubber which has structured packings, trays or random packings is advantageously used. Moreover, the scrubber preferably comprises a plurality of column beds with redistribution. Particularly preferably, the lowermost column bed is operated as a water quench for decreasing the temperature of the carbon dioxide-rich gas stream. Excess water, in particular condensate from the carbon dioxide-rich gas stream, is transferred to the basic scrubbing located above.

According to a further development of the concept of the invention, the scrubbing is carried out not in the compressed, carbon dioxide-rich gas stream intended for further use or storage but in a gas stream branched off therefrom after compression and having a reduced carbon dioxide content. This gas stream intended for release into the atmosphere is designated as "vent" gas among those skilled in the art. In this variant, a purification stage, in particular a cryogenic one, in which the gas constituents which, for example, cannot be compressed are separated off is located downstream of the compression. In this way, a gas stream having an increased carbon dioxide content, which is sent for further use or storage, and a separated-off as stream having a reduced carbon dioxide content, which is released into the atmosphere, are formed. The last-mentioned gas stream has an increased proportion of oxides of nitrogen, so that it must be purified before release into the atmosphere. Since the gas stream is already compressed, the scrubbing is preferably carried out in this branched-off gas stream in this process variant.

In this embodiment, there is the particular advantage that the oxides of nitrogen are limited to a permissible limit in the smallest gas stream before the emission point. The high concentrations present in this gas stream and the high oxygen content (e.g. 15% by volume) favour the reaction of NO to $NO_2$. The clean gas stream results in the formation of a virtually pure product which can be further utilized. An advantage over and above this is that the gas stream arrives already cold from the cryogenic purification with partial condensation, separation and reevaporation.

In general, the invention has a number of further advantages:

Owing to the compression of the gas stream and optionally the recycling of a part of the gas stream to the power station, the volume flow leading to the scrubbing is reduced, permitting a smaller size of the apparatuses. Moreover, the scrubbing can be integrated into an already present direct cooling.

Finally, another substantial advantage of the invention arises in that only salts, in particular nitrites/nitrates and sulphites/sulphates, form and can be further utilized (e.g. in the fertilizer industry). Therefore no disposal problems arise. In the case of flue gas desulphurization scrubbing upstream of the pressure scrubbing, there are improved marketing prospects since a low level of impurities is to be expected in the salts washed out. The result is a defined product which is virtually free of sulphate, chlorides, mercury and dust.

As an alternative configuration, there is the possibility of degradation of nitrite salts formed. For this purpose, ammonium nitrite is decomposed thermally or catalytically into $N_2$ and $H_2O$. Preferably, the regeneration is effected at 30° C.-120° C., particularly preferably at 50° C.-80° C. There is therefore the option, if required, of establishing a system without additional outlet streams and hence independence of the market.

Compared with the process disclosed in EP 1 790 614 A1, there are in particular considerable improvements owing to the operation, according to the invention, of the pressure scrubbing with basic washing agent constituents, in particular regarding the following criteria:

1. Corrosion Problems:

In the known process, an acid mixture which sets high requirements regarding the material used forms in the first scrubber. For example, lining with lead or coating with plastic must be provided. Through the use according to the invention of basic washing agent constituents, salts or salt solutions which do not attack conventional plant components and whose pH can be controlled are formed instead of corrosive acids. It is therefore possible to rely on more economical materials.

2. $NO_x$ Wash-Out Rate:

The known process uses water as a wash medium, it being necessary to oxidize NO completely to water-soluble $NO_2$ and to reoxidize the NO which forms on decomposition of the nitrous acid. In order to achieve low $NO_x$ values at the scrubber outlet, appropriate residence times for continuous oxidation of the NO and reoxidation of the liberated NO are necessary. This effect is compensated in the process according to the invention owing to the basic washing agent constituents, since the nitrous acid can be trapped as a water-soluble nitrite. Below, this relationship will be clarified by a comparison of the equations of the reactions taking place:

Known process:

  NO oxidation
$$NO + \tfrac{1}{2}O_2 \rightarrow NO_2$$

  $NO_2$ secondary reactions
$$2NO_2 \leftrightarrow N_2O_4$$

  $NO_x$ absorption
$$N_2O_4 + H_2O \rightarrow HNO_3 + HNO_2$$

  HNO2 decomposition
$$3HNO_2 \rightarrow HNO_3 + 2NO + H_2O$$

  net equation
$$3NO_2 + H_2O \rightarrow 2HNO_3 + NO$$

Process according to the invention (example: NaOH as washing agent constituent):

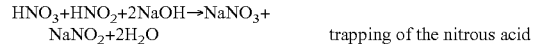  trapping of the nitrous acid
$$HNO_3 + HNO_2 + 2NaOH \rightarrow NaNO_3 + NaNO_2 + 2H_2O$$

or

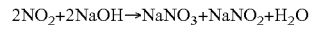
$$2NO_2 + 2NaOH \rightarrow NaNO_3 + NaNO_2 + H_2O$$

Process according to the invention (example: $NH_3$ as washing agent constituent):

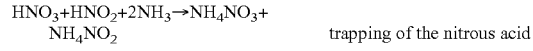  trapping of the nitrous acid
$$HNO_3 + HNO_2 + 2NH_3 \rightarrow NH_4NO_3 + NH_4NO_2$$

or

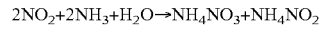
$$2NO_2 + 2NH_3 + H_2O \rightarrow NH_4NO_3 + NH_4NO_2$$

In the use according to the invention of alkaline wash media, the nitrous acid is trapped before its decomposition and converted into a water-soluble nitrite salt. This shortens the required residence time in the scrubber.

3. Overall Size:

Since only the $NO_2$ can be washed out by means of water, the size of the scrubber in the case of the known process is dependent on the rate of the NO oxidation and the $NO_x$ content to be achieved.

In the use according to the invention of alkaline wash media, on the other hand, complete oxidation to water-soluble $NO_2$ is not necessary. An equimolar ratio of NO and $NO_2$ is sufficient for washing out $NO_x$ in an aqueous solution as nitrite. This effect again reduces the residence time and makes the design of the scrubber more compact. The following equations clarify this relationship:

Process according to the invention (example: NaOH as washing agent constituent):

$NO + \tfrac{1}{2}O_2 \rightarrow NO_2$   NO oxidation $NO_2 + NO + 2NaOH \rightarrow 2NaNO_2 + H_2O$   $NO_x$ absorption $2NO + \tfrac{1}{2}O_2 + 2NaOH \rightarrow 2NaNO_2 H_2O$   net equation Process according to the invention (example: $NH_3$ as washing agent constituent):

$NO + \tfrac{1}{2}O_2 \rightarrow NO_2$   NO oxidation $NO_2 + NO + 2NH_3 + H_2O \rightarrow 2NH_4NO_2$   NO absorption $2NO + \tfrac{1}{2}O_2 + 2NH_3 + H_2O \rightarrow 2NH_4NO_2$   net equation 4. Catalysts and Oxidizing Agents:

The pressure scrubbing according to the invention with basic washing agent constituents has additional advantages over other processes. As a rule, when washing out pollutants by means of a scrubber, an oxidizing agent should be added or a prior step for partial or complete oxidation by means of a catalyst, oxidizing agents or free radical formers should be included upstream in order to convert pollutants into a water-soluble form.

In pressure scrubbing operated with the basic constituents, catalysts or oxidizing agents are completely omitted since the NO oxidation takes place independently and in an accelerated manner by means of existing oxygen under pressure, parallel to the washing out as nitrite or nitrate.

5. Simultaneous $SO_2$ and $NO_x$ Removal:

EP 1 790 614 A1 describes, in addition to the washing out of $NO_x$ alone, mainly the simultaneous elimination of $SO_2$ and $NO_x$. In this case, the $NO_2$ acts as a catalyst for the $SO_2$ oxidation. Only after complete oxidation of the oxides of sulphur and washing out thereof as acid can the NO oxidation begin in order to wash out $NO_2$ as acid. A mixture of different acids forms. With the use of basic washing agent constituents, a complete oxidation of the $SO_2$ is no longer necessary since, for example with ammonia, it is washed out as ammonium bisulphite. Thus, the residence time can be shortened in this case too. A mixture of salts dissolved in water forms. This state of affairs is illustrated by the following equations:

Known process (oxidation of $SO_2$):

$NO + \tfrac{1}{2}O_2 \rightarrow NO_2$   NO oxidation $SO_2 + NO_2 \rightarrow SO_3 + NO$   $SO_2$ oxidation/$NO_2$ reduction $SO_3 + H_2O \rightarrow H_2SO_4$   $SO_3$ absorption Process according to the invention (example: ammonia as washing agent constituent)

$NH_3 + SO_2 + H_2O \rightarrow NH_4HSO_3$ $NH_4HSO_3 + NH_3 \rightarrow (NH_4)_2SO_3$ $(NH_4)_2SO_3 + O_2 \rightarrow (NH_4)_2SO_4$ Process according to the invention (example: NaOH as washing agent constituent)

$2NaOH + SO_2 \rightarrow Na_2SO_3 + H_2O$ $Na_2SO_3 + \tfrac{1}{2}O_2 \rightarrow Na_2SO_4$ In addition, a mixture of ammonium sulphate/sulphite and nitrate/nitrite is obtained with the use of a basic additive (e.g. $NH_3$). This mixture can be completely oxidized with little effort and can be used as mixed fertilizer. In the process disclosed in EP 1 790 614 A1, on the other hand, an acid mixture which requires separation and concentration of the individual acids for marketing is obtained in the simultaneous removal of pollutants.

The invention is suitable for all conceivable large furnaces in which carbon dioxide-containing gas streams occur. These include, for example, power stations operated with fossil fuels, industrial furnaces, steam boilers and similar large thermal plants for electricity and/or heat generation. The invention can be particularly advantageously used in large furnaces which are supplied with technically pure oxygen or oxygen-enriched air as fuel gas and in which accordingly waste gas streams having high carbon dioxide concentrations result. In particular, the invention is suitable for so-called low $CO_2$ coal power stations which are operated with oxygen as fuel gas ("oxyfuel" power stations) and in which the carbon dioxide present in the waste gas in high concentration is separated off and forced underground ("$CO_2$ capture technology").

The invention is to be explained in more detail below with reference to working examples shown schematically in the figures:

BRIEF DESCRIPTION OF DRAWINGS

FIG. 1 shows, as embodiment A, a flue gas purification according to the prior art. The waste gas (flue gas) of a combustion boiler K of a coal power station is first fed for deducting by means of a filter unit F. This is followed by desulphurization in a desulphurization unit FDP (e.g. by scrubbing). Downstream of the desulphurization unit FDP is a nitrogen oxide oxidation unit OX in which the oxides of nitrogen are oxidized by means of a catalyst or by addition of an oxidizing agent, for example. Thereafter, washing out of the oxides of nitrogen in a scrubber S is effected. Depending on the process, the oxidation unit can be combined with the scrubber and both a simultaneous desulphurization and denox can be effected. A part of the purified waste gas is recycled via recycle pipe Y to the combustion boiler K of the power station.

Figure 1:
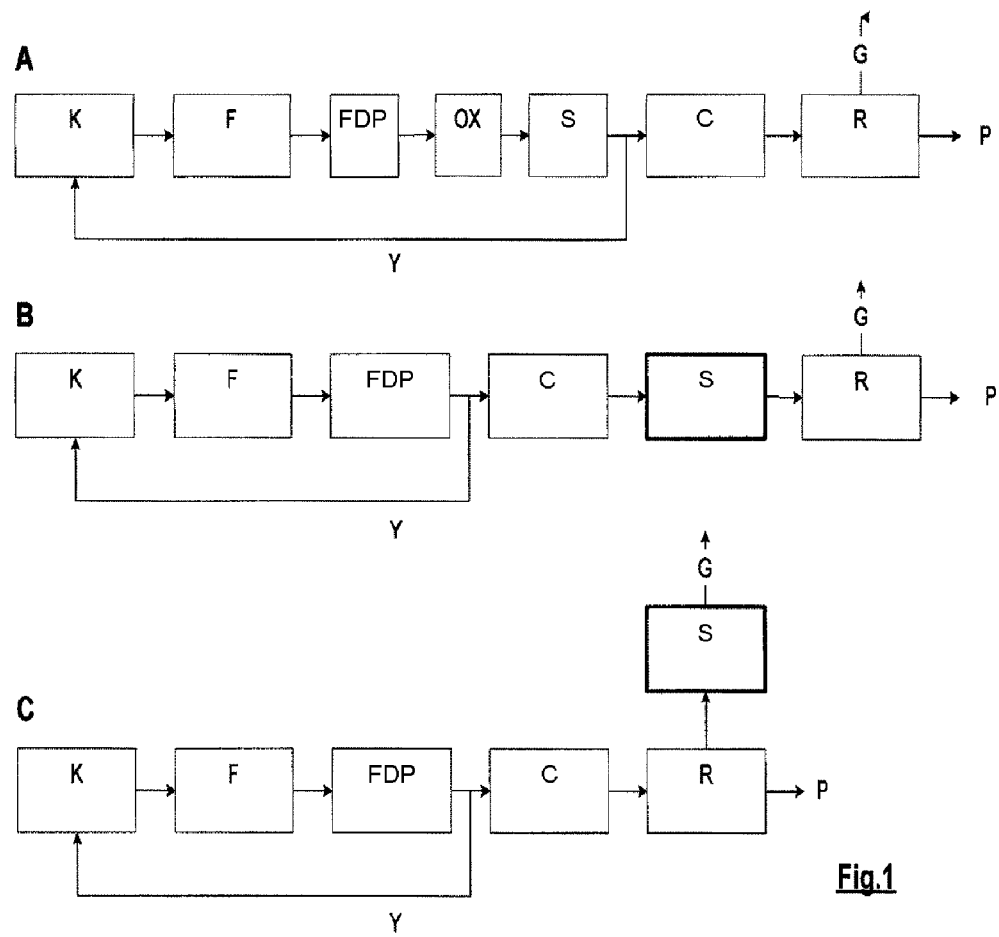
FIG. 1 shows a comparison of block diagrams of a flue gas purification according to the prior art (A) with two variants of the invention (B and C)

In the present example, the power station should be the power station operating by the oxygen fuel gas process (so-called "oxyfuel" power station). The coal is burned with technically pure oxygen (oxygen content in the fuel gas >95% by volume). The carbon dioxide-rich waste gas of this combustion is to a large extent to be forced into underground rock strata in order to reduce the carbon dioxide emissions into the atmosphere and the associated climatically harmful effects (greenhouse effect). For this purpose, the waste gas prepared in the purification steps described above is compressed by means of a compressor C and first fed to a cryogenic purification R in which the uncompressible constituents are separated off and are taken off as gas stream G ("vent" gas). The remaining carbon dioxide-rich waste gas stream is finally passed for pressurization P, for example via pipelines and intermediate storage containers.

In this conventional flue gas purification, removal of pollutants is therefore effected in the region virtually at atmospheric pressure before the waste gas compression.

Embodiment B shows, for comparison, a flue gas purification according to the invention, in which basic pressure scrubbing is effected in the waste gas stream after the compression C. As in embodiment A, the starting point is a power station which operates according to the oxygen fuel gas process ("oxyfuel" power station). The carbon dioxide-rich waste gas occurring in the combustion boiler K is firstly dedusted in a filter device F analogously to embodiment A and then subjected to flue gas desulphurization FDP. A part of the waste gas prepared in this manner is recycled via the recycle pipe Y to the combustion boiler K for lowering the combustion temperature and hence reducing the formation of oxides of nitrogen. The waste gas stream is fed to a compressor C. The compressed waste gas stream is passed to the basic pressure scrubbing of a scrubber unit W. The waste gas substantially freed from oxides of nitrogen is then separated in a cryogenic purification stage R into a gas stream G which contains the noncompressible constituents and a carbon dioxide-rich waste gas stream which is substantially free of oxides of nitrogen and is provided for the pressurization P. In contrast to the conventional flue gas purification according to embodiment A, basic scrubbing W at an elevated pressure is effected after the compression of the waste gas stream in the compressor C, instead of the denox in the region roughly at atmospheric pressure.

In embodiment C, a variant of the invention is described in which the basic pressure scrubbing W is effected in the branched-off gas stream G ("vent" gas). This variant differs from embodiment B in that the waste gas stream compressed in the compressor C is not fed directly to the pressure scrubbing W but is first treated in the cryogenic purification R. The noncompressible constituents are separated off from the waste gas stream thereby. The gas stream G separated off contains a reduced proportion of carbon dioxide and an increased proportion of oxides of nitrogen. For substantial removal of the oxides of nitrogen from the gas stream G provided for release into the atmosphere, the oxides of nitrogen are converted into dissolved salts in the pressure scrubbing W and are washed out. The gas stream G purified in this manner can then be released into the environment. The remaining waste gas stream having an increased carbon dioxide content is sent for pressurization P.

Figure 2:
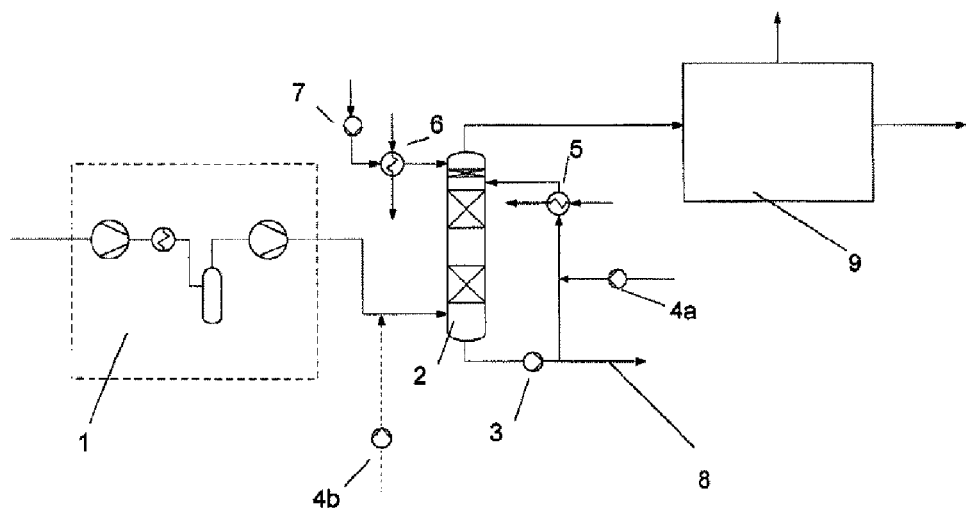
FIG. 2 shows a detailed view of a flue gas purification with pressure scrubbing in the compressed waste gas stream

FIG. 2 shows a detailed view of the compression and scrubbing of the waste gas stream. There, the arrangement corresponds to the embodiment B shown in the block diagram of FIG. 1. The carbon dioxide-rich flue gas prepurified in the dedusting and desulphurization, which are not shown, is, in the present working example, compressed in a compressor 1 with intermediate cooling to the desired pressure of 20 to 40 bar. NO present is reacted to give $NO_2$ via the increased pressure, sufficient residence time and in the presence of oxygen. The $CO_2$ crude gas is quenched after the last compressor stage in scrubber 2. To protect the material of the apparatuses from acids which condense out, the basic additive can optionally be fed in after the compressor stages via a pipe 4b. In the scrubber 2, the gas is transported countercurrently to the wash medium. The wash medium is introduced in a recycle 3 onto the uppermost bed. In this recycle, the basic additive is fed in via a pipe 4a. The temperature above the scrubber 2 is adjusted via the coolers 5 and 6. The scrubber column contains, as the uppermost bed, an additional water scrubbing 7 and demister for retaining entrained material. A salt solution is taken off continuously via pipe 8. The purified $CO_2$ stream is then sent to the subsequent drying, the cryogenic purification 9 (partial condensation and reevaporation) and further compression. The concentrations of oxides of nitrogen and of sulphur dioxide in the "vent" gas and in the $CO_2$ product stream correspond to the permissible and required concentrations.

The invention claimed is:

1. A process for removing at least a part of at least one impurity from an oxygen-containing gas stream, said process comprising:
    scrubbing a chemical compound selected from the group consisting of oxides of sulphur ($SO_x$) and oxides of nitrogen ($NO_x$) from an oxygen-containing gas stream with at least one washing agent, wherein at least one impurity is converted by a reaction with the oxygen present in the oxygen-containing gas-stream and at least one basic constituent of the washing agent at an elevated pressure of at least 2 bar, wherein the reaction forms at least one salt, and wherein at least a part of the at least one impurity is washed out as dissolved salt,
    wherein the oxygen-containing gas stream is formed from a carbon dioxide-rich waste gas stream of a large furnace, in which fossil fuels are burned with a combustion gas having a high proportion of oxygen than air, and wherein said carbon dioxide-rich waste gas stream is compressed before said scrubbing, and
    wherein, prior to compression, said carbon dioxide-rich waste gas stream is subjected to desulphurization.

2. The process according to claim 1, wherein a part of the carbon dioxide-rich gas stream is recycled back to said furnace before compression.

3. The process according to claim 1, wherein the compressed carbon dioxide-rich gas stream is sent for utilization or storage after the scrubbing.

4. The process according to claim 1, wherein the basic constituent of the washing agent comprises ammonia ($NH_3$) and/or sodium hydroxide (NaOH).

5. The process according to claim 1, wherein at least a part of the washing agent laden with the dissolved salt is converted into a form which can be disposed of in a landfill and/or is regenerated.

6. The process according to claim 1, wherein the scrubbing is carried out at a pressure between 10 and 60 bar.

7. The process of to claim 6, wherein scrubbing is carried out at a pressure between 20 and 40 bar.

8. The process according to claim 1, wherein the scrubbing is carried out at a temperature of 10 to 120° C.

9. The process of to claim 8, wherein scrubbing is carried out at a temperature of 10 to 35° C.

10. The process according to claim 1, wherein the oxygen-containing gas stream has an oxygen content in a range from 2 to 20% by volume.

11. The process of to claim 10, wherein gas stream has an oxygen content in a range from 3 to 6% by volume.

12. The process according to claim 1, wherein an oxidation of NO to $NO_2$ and a conversion into nitrite or nitrate are carried out before the scrubbing, wherein the conversion into nitrite or nitrate is achieved by feeding in an additive.

13. The process according to claim 1, wherein at least one substance which promotes mass transfer by increasing the surface area is added to the washing agent.

14. The process according to claim 13, wherein said at least one substance is a substance which serves as a catalyst or as a support for a catalyst is added.

15. The process according to claim 1, wherein the carbon dioxide-rich gas stream is fed to a purification stage, from which a gas stream having an increased carbon dioxide content is taken off and is sent for utilization or storage, and a gas stream having a reduced carbon dioxide content is taken off and is released into the atmosphere, and wherein the scrubbing is carried out in the gas stream having a reduced carbon dioxide content.

16. The process of to claim 1, wherein the large furnace is a power station.

17. The process of to claim 1, wherein the basic constituent is added before scrubbing.

18. The process of to claim 1, wherein the basic constituent is added during scrubbing.

19. The process according to claim 1, wherein, after compression, said carbon dioxide-rich waste gas stream is sent directly to said scrubbing.

* * * * *